Patented June 11, 1946

2,401,778

UNITED STATES PATENT OFFICE 2,401,778

PROCESSES FOR PRODUCTION OF 3-HYDROXY-2-BUTANONE

Newell Sjolander, Rutherford, N. J., and William Eisenman, New York, N. Y., assignors to Heyden Chemical Corporation, New York, N. Y., a corporation of Delaware No Drawing. Application July 10, 1943, Serial No. 494,268

6 Claims. (Cl. 195—13)

This invention relates to the production of 3-hydroxy-2-butanone (also known as acetoin and acetylonethylcarbinal) from carbohydrates by superimposing an Acetobacter fermentation upon an Aerobacter fermentation.

It is well known that many species of bacteria produce 2,3-butanediol (2,3-butylene glycol) and 3-hydroxy-2-butanone by fermentation of carbohydrates. Some bacteria of the genus Aerobacter and the group Aerobacillus, when grown under special conditions, can produce quite high concentrations of 2,3-butanediol; but the 3-hydroxy-2-butanone, which is simultaneously produced in small amounts in a normal fermentation, is seldom present in the fermentation liquor at a concentration above one per cent.

In British Patent No. 315,264 (which corresponds to Kluyver and Scheffer U. S. Patent No. 1,899,094) is described a process for increasing the concentration of 3-hydroxy-2-butanone in fermentation liquors by increasing the rate of aeration during the fermentation. Extremely high rates of aeration are required, according to said disclosure, thereby introducing problems of supplying sufficient sterile air, air dispersion and prevention of foaming. Furthermore, the amount of 3-hydroxy-2-butanone that can be produced by this procedure is limited, since 3-hydroxy-2-butanone itself inhibits this reaction when certain species of the genus Aerobacter are used (Paretsky, Wood, and Werkman, Jour. Bact., 1942, Vol. 44, page 257).

It is well known that certain bacteria of the genus Acetobacter have the ability to oxidize or dehydrogenate a wide variety of alcohols, glycols, sugars, and other compounds, to produce chemicals, some of which are valuable in the trade. Kling (Compt. rend., 1905, vol. 140, page 1456) discovered that 3-hydroxy-2-butanone was produced when 2,3-butanediol was added to a nutrient solution containing yeast extract that had been inoculated with the sorbose bacterium or Mycoderma aceti.

We have found that the conversion of 2,3-butanediol to 3-hydroxy-2-butanone can be much more readily carried out with bacteria of the genus Acetobacter than with bacteria of the genus Aerobacter.

In practicing the process of our invention it is possible to obtain much higher concentrations of 3-hydroxy-2-butanone than were heretofore produced. In accordance with the process of our invention, the fermentation liquors from a carbohydrate fermentation by means of a 2,3-butanediol-producing organism of the genus Aerobacter are inoculated with bacteria of the genus Acetobacter. In our process it is unnecessary to isolate the intermediate product because the Acetobacter fermentation is superimposed directly upon the Aerobacter fermentation. It is also unnecessary to add additional nutrients to the mash because the Acetobacter cells can grow upon the nutrients remaining in the fermentation mash and upon substances produced by the Aerobacter cells. Additional nutrients and growth factors may, however, be added in order to speed up the rate of fermentation and to increase the yield of 3-hydroxy-2-butanone.

A further advantage of our process is that the concentration of 3-hydroxy-2-butanone in the final fermentation liquors is much higher than hitherto obtained. Concentrations of 3-hydroxy-2-butanone up to 10 per cent, or higher, can be obtained in accordance with the process. Because of the high concentration of 3-hydroxy-2-butanone in the fermentation liquor, this compound can be more easily, and more cheaply, recovered in pure form. Furthermore, the 3-hydroxy-2-butanone is present in the fermentation liquors in concentrations high enough to enable one to convert it directly, without isolation, into valuable chemicals. For example, by oxidation of the fermentation liquors with ferric sulfate or copper sulfate or other oxidizing agents the 3-hydroxy-2-butanone in said liquors can be converted to diacetyl. The fermentation liquors containing 3-hydroxy-2-butanone can be heated with ammonia to produce tetramethylpyrazine. By heating the fermentation liquors containing 3-hydroxy-2-butanone with urea or certain amines, condensation products are formed.

The process used in our invention consists in first preparing a mash containing a fermentable carbohydrate, a nitrogen compound, and mineral salts. The carbohydrate source may be corn, wheat or other grain, potatoes, molasses, whey, sugars or other fermentable carbohydrates. For nitrogen sources, we have found urea, ammonium sulfate and corn steep liquor satisfactory, but other nitrogen-containing substances may also be used. Mineral salts such as magnesium sulfate, potassium acid phosphate, calcium carbonate, and others, may be added to the mash. The mash is sterilized with steam, cooled, and inoculated with a culture of bacteria which produce 2,3-butanediol. Bacteria of the genus Aerobacter or group Aerobacillus may be used. The temperature of the mash is kept at 30° C. to 37° C., and sterile air is forced through the fermentation liquor at a rate of one to ten cubic feet per minute per 100 gallons. This stage of the fermentation is continued for 36 to 72 hours, or until carbohydrate utilization has ceased.

When sugar solutions are being fermented, an initial concentration of 10 to 20 percent is usually used. Additional sugar may be added after the fermentation is under way. This can be readily accomplished by adding sterile, concentrated sugar solutions at periodic intervals or by continuous slow drip. It may be necessary to add additional urea and phosphate when large amounts of sugar are being fermented. With this procedure we have been able to ferment higher concentrations of carbohydrates and obtain higher concentrations of 2,3-butanediol than have hitherto been obtained.

The Aerobacter fermentation liquors are then inoculated with from 2 to 10 per cent of an active seed culture or inoculum of bacteria of the genus Acetobacter, which has been previously grown in a nutrient medium suitable for bacteria of this type and aerated for a length of time sufficient to give a good population of bacterial cells. The Acetobacter inoculum or seed may be added directly to the Aerobacter fermentation liquor, or the latter may be first filtered, sterilized, or enriched with nutrients such as yeast or corn steep liquor. The inoculated mash is held at a temperature of 25° C. to 35° C. and continually aerated with finely-dispersed, sterile air at a rate of 2 to 40 cubic feet per minute per 100 gallons. This second stage of the fermentation is continued for a period of 2 to 5 days, or until the 3-hydroxy-2-butanone has reached its maximum concentration. An overall yield of 3-hydroxy-2-butanone of 30 to 40 per cent of the original sugar may be obtained.

The 3-hydroxy-2-butanone may be recovered from the fermentation liquors by any of the well-known procedures of distillation, extraction, or salting out, or by direct chemical conversion to other products which precipitate out or may be otherwise easily separated from the fermentation liquor.

*Example 1.*—A culture of *Aerobacter aerogenes* was used to inoculate a mash containing 11.6 per cent glucose, 0.2 per cent urea, 0.2 per cent potassium dihydrogen phosphate, 0.02 per cent magnesium sulfate, and 0.5 per cent calcium carbonate. The inoculated mash was aerated with finely-dispersed, sterile air at a rate of 2 cubic feet per minute per 100 gallons and held at a temperature of 34° C. to 36° C. A sterile solution of approximately 60 percent glucose was slowly added during fermentation to give a total amount of 19.2 per cent glucose. Additional sterile urea and potassium dihydrogen phosphate solutions were added to raise the total concentration of each to 0.3 percent. After 48 hours, all of the sugar was fermented and the fermentation liquors contained 6.71 grams of 2,3-butanediol and 0.45 gram of 3-hydroxy-2-butanone per 100 ml.

Two liters of the resulting fermentation liquor were inoculated with 5 per cent by volume of a 24-hour, aerated culture of *Acetobacter suboxydans* grown on sorbitol-yeast extract broth. The fermentation was aerated with sterile air that was charged through carborundum diffuser stones at a rate of 0.2 cubic foot per minute. The temperature of the fermentation batch was held at 28° C. When the Acetobacter fermentation was 72 hours old the fermentation was stopped. The final concentration of 3-hydroxy-2-butanone in the liquor was 5.92 grams per 100 ml.

*Example 2.*—Seven liters of the final *Aerobacter aerogenes* fermentation liquor described in Example 1 was treated with 120 grams of lime and 55 ml. of 85 per cent phosphoric acid, and warmed to 60° C. The floc was filtered off and discarded. The filtrate, which contained 6.59 grams of 2,3-butanediol and 0.45 gram of 3-hydroxy-2-butanone per 100 ml., provided the substrate for an *Acetobacter suboxydans* fermentation. One-half per cent yeast extract was added to 2 liters of the clarified liquor and this mash was sterilized 30 minutes with steam at a pressure of 15 pounds per square inch gauge.

After sterilization, the mash was cooled and inoculated with 5 per cent by volume of a 24-hour, aerated culture of *Acetobacter suboxydans* that was grown on sorbitol-yeast extract broth. The fermentation was aerated with sterile air that was charged through carborundum diffuser stones at a rate of 0.1 cubic foot per minute. The temperature of the fermentation was held at 28° C. When the Acetobacter fermentation was 94 hours old, the fermentation was stopped. The final concentration of 3-hydroxy-2-butanone in the fermentation liquor was 6.12 grams per 100 ml.

*Example 3.*—Thirty gallons of mash containing 35 pounds of Cerelose (a commercial glucose), 220 grams of potassium dihydrogen phosphate, and 17 grams of magnesium sulfate was prepared in a 75-gallon aluminum kettle and sterilized for 30 minutes with steam at a pressure of 15 pounds per square inch gauge. After cooling, a sterile suspension of 650 grams of calcium carbonate in 2500 ml. of water and a sterile solution of 285 grams of urea in 1000 ml. of water were added aseptically. The mash was then inoculated with 6 liters of a 28-hour culture of *Aerobacter aerogenes* that was grown in peptone-beef extract-glucose-calcium carbonate broth. The inoculated mash was aerated with sterile air, finely dispersed by passage through carborundum air diffuser tubes, at a rate of 2 cubic feet per minute. The fermentation temperature was maintained at 33° C. to 36° C. Additional nutrients were added as sterile solutions during the fermentation as follows: 13 pounds of Cerelose as a 60 per cent solution at 20 hours, 7 pounds of Cerelose as a 60 per cent solution at 23 hours, 12 pounds of Cerelose as a 60 per cent solution at 26 hours, 45 grams of urea as a 20 per cent solution at 20 hours and 45 grams of urea as a 20 per cent solution at 26 hours, and 35 grams of potassium dihydrogen phosphate as a 15 per cent solution at 20 hours and 35 grams of potassium dihydrogen phosphate as a 15 per cent solution at 26 hours. All of the sugar was fermented after 50 hours. At this time the fermenation liquors contained 6.87 grams of 2,3-butanediol and 0.81 gram of 3-hydroxy-2-butanone per 100 ml.

At this point, an active culture of *Acetobacter suboxydans* was added to the fermentation mash. This culture was previously grown in three six-liter flasks each containing two liters of sterile mash composed of 5 per cent glycerine, 0.5 per cent corn steep liquor, 0.5 per cent malt sprouts, and 0.15 per cent calcium carbonate. The inoculated mash was aerated with sterile air and held at a temperature of 27° C. Six liters of this *Acetobacter suboxydans* culture and 500 grams of sterile corn steep liquor were added to the fermenter. Aeration was continued as before, but at a rate of 3 cubic feet per minute. The temperature was held at 29–31° C. The 3-hydroxy-2-butanone content of the fermentation liquors increased to 6.61 grams per 100 ml. when the acetobacter fermentation was 64 hours old. The 2,3-butanediol concentration was 0.85 gram per 100 ml. of fermentation liquor.

Pure 3-hydroxy-2-butanone was isolated from the fermentation liquors by extracting them with ether, removing the ether from the extract by evaporation, and fractionating the residue containing 3-hydroxy-2-butanone under vacuum. The dimer of 3-hydroxy-2-butanone, which crystallized out from the distilled fraction in the refrigerator, melted at 92–98° C. and changed to the monomer, which boiled at 142–144° C.

Sixteen and one-half (16½) liters of the final fermentation liquors containing 1089 grams of 3-hydroxy-2-butanone were mixed with 10 pounds of copper sulfate. By distillation through a fractionating column 969 grams of diacetyl were recovered.

The above examples are merely given to illustrate our invention and should not be construed to limit it, since many small variations in procedure will be apparent to those skilled in the art.

Having thus described our invention, what we claim as new and desire to secure by Letters Patent is:

1. A process for the production of 3-hydroxy-2-butanone which comprises the fermentation of a carbohydrate-containing mash by means of a 2,3-butanediol-producing organism of the genus Aerobacter and subsequent fermentation of the resulting 2,3-butanediol-containing fermentation liquor by a 3-hydroxy-2-butanone-producing organism of the genus Acetobacter.

2. A process for the production of 3-hydroxy-2-butanone which comprises fermenting by means of a 2,3-butanediol-producing organism of the genus Aerobacter a glucose-containing mash having an initial glucose concentration within the range of approximately 10 to approximately 20 per cent, adding glucose during the fermentation until the mash contains a quantity equivalent to not more than approximately 20 per cent, in order to produce a liquor containing a substantial proportion of 2,3-butanediol, and subsequently fermenting the resulting liquor by means of a 3-hydroxy-2-butanone-producing organism of the genus Acetobacter.

3. A process for the production of 3-hydroxy-2-butanone which comprises fermenting by means of a 2,3-butanediol-producing organism of the genus Aerobacter a glucose-containing mash having an initial glucose concentration within the range of approximately 10 to approximately 20 per cent, adding glucose during the fermentation until the mash contains a quantity equivalent to not more than approximately 20 per cent, in order to produce a liquor containing a substantial proportion of 2,3-butanediol, sterilizing the resulting liquor and subsequently fermenting it by means of a 3-hydroxy-2-butanone-producing organism of the genus Acetobacter.

4. A process for the production of 3-hydroxy-2-butanone which comprises the fermentation of a glucose-containing mash under aerobic conditions by means of *Aerobacter aerogenes* to produce a liquor containing a substantial proportion of 2,3-butanediol and subsequent fermentation of the resulting liquor by means of *Acetobacter suboxydans* under aerobic conditions.

5. A process for the production of 3-hydroxy-2-butanone which comprises fermenting under aerobic conditions a glucose-containing mash by means of *Aerobacter aerogenes*, which mash contains initially approximately 11.6 per cent of glucose, adding glucose during the fermentation until the mash contains a quantity equivalent to approximately 19.2 per cent glucose, and subsequently fermenting the resulting 2,3-butanediol-containing fermentation liquor under aerobic conditions by means of *Acetobacter suboxydans*.

6. A process for the production of 3-hydroxy-2-butanone which comprises fermenting under aerobic conditions a glucose-containing mash by means of *Aerobacter aerogenes*, which mash contains initially approximately 11.6 per cent of glucose, adding glucose during the fermentation until the mash contains a quantity equivalent to approximately 19.2 per cent glucose, clarifying and sterilizing the resulting 2,3-butanediol-containing fermentation liquor and subsequently subjecting it to fermentation under aerobic conditions by means of *Acetobacter suboxydans*.

NEWELL SJOLANDER.
WILLIAM EISENMAN.